(12) United States Patent
Orsley (10) Patent No.: US 12,431,164 B2
(45) Date of Patent: Sep. 30, 2025

(54) STORAGE MEDIUMS AND METHODS OF MAKING THE SAME

(71) Applicant: CORNING INCORPORATED, Corning, NY (US)

(72) Inventor: Timothy James Orsley, San Jose, CA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/626,433

(22) Filed: Apr. 4, 2024

(65) Prior Publication Data

US 2024/0347075 A1    Oct. 17, 2024

Related U.S. Application Data

(60) Provisional application No. 63/458,709, filed on Apr. 12, 2023.

(51) Int. Cl.
| | | |
|---|---|---|
| *G11B 7/243* | (2013.01) | |
| *G11B 7/0045* | (2006.01) | |
| *G11B 7/24047* | (2013.01) | |
| *G11B 7/2531* | (2013.01) | |

(52) U.S. Cl.
CPC .......... *G11B 7/243* (2013.01); *G11B 7/00451* (2013.01); *G11B 7/24047* (2013.01); *G11B 7/2531* (2013.01); *G11B 2007/2431* (2013.01)

(58) Field of Classification Search
CPC ......... B32B 3/10; G11B 7/24; G11B 7/24035; G11B 7/24053
See application file for complete search history.

(56) References Cited

U.S. PATENT DOCUMENTS

| | | | |
|---|---|---|---|
| 5,224,090 A | * | 6/1993 | Umeda ............... G11B 7/24 |
| 5,272,326 A | * | 12/1993 | Fujita ............... G11B 7/0033 |
| | | | 235/487 |
| 6,023,451 A | * | 2/2000 | Kashiwagi ......... G11B 7/24038 |
| 8,155,427 B2 | | 4/2012 | Pasupuleti |
| 11,007,606 B2 | | 5/2021 | Kunze et al. |
| 2022/0002418 A1 | | 1/2022 | Zhu et al. |

FOREIGN PATENT DOCUMENTS

| | | | |
|---|---|---|---|
| EP | 0288073 | * | 10/1988 |
| KR | 2015/0884755 | * | 7/2015 |
| WO | 2022/171522 A1 | | 8/2022 |
| WO | 2022/194354 A1 | | 9/2022 |

* cited by examiner

*Primary Examiner* — Elizabeth E Mulvaney
(74) *Attorney, Agent, or Firm* — Svetlana Z. Short (57) ABSTRACT

A storage medium includes a base substrate, a first metallic layer, a first border region, and a first cover substrate. The base substrate includes a first side and a second side. The first side and the second side oppose one another. The first metallic layer defines a first pattern. The first metallic layer directly abuts the first side of the base substrate. The first border region extends about the first pattern. The first cover substrate is positioned against an exposed surface of the first metallic layer such that the first metallic layer is positioned between the first side of the base substrate and the first cover substrate. The first cover substrate is coupled to the first border region.

28 Claims, 6 Drawing Sheets

STORAGE MEDIUMS AND METHODS OF MAKING THE SAME

CROSS-REFERENCE TO RELATED APPLICATIONS

This application claims the benefit of priority under 35 U.S.C. § 119 of U.S. Provisional Application Ser. No. 63/458,709 filed on Apr. 12, 2023, the content of which is relied upon and incorporated herein by reference in its entirety.

BACKGROUND

The present disclosure generally relates to data storage. More specifically, the present disclosure generally relates to storage mediums.

SUMMARY

According to various examples, a storage medium includes a base substrate, a first metallic layer, a first border region, and a first cover substrate. The base substrate includes a first side and a second side. The first side and the second side oppose one another. The first metallic layer defines a first pattern. The first metallic layer directly abuts the first side of the base substrate. The first border region extends about the first pattern. The first cover substrate is positioned against an exposed surface of the first metallic layer such that the first metallic layer is positioned between the first side of the base substrate and the first cover substrate. The first cover substrate is coupled to the first border region.

According to some examples, a storage medium includes a base substrate, a first metallic layer, a first border region, a first cover substrate, a second metallic layer, a second border region, and a second cover substrate. The base substrate includes a first side and a second side. The first side and the second side oppose one another. The base substrate may absorb light at each wavelength within the visible light spectrum. The base substrate includes at least one material chosen from, a glass material, a ceramic material, and a glass-ceramic material. The first metallic layer defines a first pattern. The first metallic layer directly abuts the first side of the base substrate. The first border region that extends about the first pattern. The first cover substrate is positioned against an exposed surface of the first metallic layer such that the first metallic layer is positioned between the first side of the base substrate and the first cover substrate. The first cover substrate is coupled to the first border region. The first cover substrate includes at least one material chosen from, a glass material, a ceramic material, and a glass-ceramic material. The first cover substrate may be transparent at each wavelength within the visible light spectrum. The second metallic layer defines a second pattern. The second metallic layer directly abuts the second side of the base substrate. The first pattern and the second pattern can be different from one another. The second border region extends about the second pattern. The second cover substrate is positioned against an exposed surface of the second metallic layer such that the second metallic layer is positioned between the second side of the base substrate and the second cover substrate. The second cover substrate is coupled to the second border region. The second cover substrate may be transparent at each wavelength within the visible light spectrum. The second cover substrate includes at least one material chosen from, a glass material, a ceramic material, and a glass-ceramic material.

In examples, a method of storing information can include depositing a first metallic layer on a first side of a base substrate. The base substrate may absorb light at each wavelength within the visible light spectrum. The method of storing information can also include depositing a first photoresist layer onto an exposed surface of the first metallic layer such that the first metallic layer is positioned between the first side of the base substrate and the first photoresist layer. The method of storing information can further include applying a first pattern to the first photoresist layer. The first pattern exposes regions of the first metallic layer that are positioned directly below the first pattern. Additionally, the method of storing information can include removing a portion of the regions of the first metallic layer that are exposed by the first pattern such that the first pattern is imprinted onto the first metallic layer. Further, the method of storing information can include removing the first photoresist layer. The method of storing information can also include positioning a first cover substrate over the first metallic layer such that the first metallic layer is positioned between the first side of the base substrate and the first cover substrate. The first cover substrate may be transparent at each wavelength of the visible light spectrum. The method of storing information can further include coupling the first cover substrate to the first metallic layer such that information conveyed by the first pattern is stored.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

In today's society, individuals are generating increasing amounts of data to be stored. Due to the volume of data being generated, economical and efficient data storage systems are needed. Additionally, information storage systems are needed that are durable and resistant to environmental degradation. The present disclosure provides storage mediums that are capable of economical and efficient data transfer and/or data storage. Additionally, the present disclosure provides storage mediums that are durable and resistant to environmental degradation. Furthermore, the present disclosure provides methods for making the storage mediums discussed herein.

Referring to FIGS. 1-5, reference numeral 10 generally designates a storage medium. The storage medium 10 includes a base substrate 14, a first metallic layer 18, a first border region 22, and a first cover substrate 26. The base substrate 14 includes a first side 30 and a second side 34. The first side 30 and the second side 34 oppose one another. The first metallic layer 18 defines a first pattern 38. The first metallic layer 18 directly abuts the first side 30 of the base substrate 14. In various example, the first metallic layer 18 may be applied to the base substrate 14 by vapor deposition. The first border region 22 extends about the first pattern 38. In some examples, the first border region 22 may surround the first pattern 38. The first cover substrate 26 is positioned against an exposed surface of the first metallic layer 18 such that the first metallic layer 18 is positioned between the first side 30 of the base substrate 14 and the first cover substrate 26. In some examples, the first metallic layer 18 may be made from aluminum. However, the present disclosure is not so limited. Rather, alternative metals may be employed in the first metallic layer 18. For example, the first metallic layer 18 may be made from silver.

Referring again to FIGS. 1-5, the exposed surface of the first metallic layer 18 is a side of the first metallic layer 18 that is opposite to a side of the first metallic layer 18 that is in direct physical contact with the first side 30 of the base substrate 14. For example, if a bottom surface of the first metallic layer 18 is in direct physical contact with the first side 30 of the base substrate 14, then the exposed surface of the first metallic layer 18 may be a top surface of the first metallic layer 18. The first cover substrate 26 may be coupled to the first border region 22. For example, the first cover substrate 26 may be coupled to the first border region 22 by laser welding. In some examples, the first border region 22 may be an unpatterned region of the first metallic layer 18. In such examples, an edge 42 of the first metallic layer 18 may be aligned with an edge 46 of the base substrate 14. Similarly, in such examples, the edge 42 of the first metallic layer 18 may be aligned with an edge 50 of the first cover substrate 26. Accordingly, in such an example, the edge 42 of the first metallic layer 18, the edge 46 of the base substrate 14, and the edge 50 of the first cover substrate 26 may be coplanar with one another. In alternative examples, the first border region 22 may be a region of the base substrate 14. In such examples, the edge 42 of the first metallic layer 18 may be sealed by the coupling between the first cover substrate 26 and the base substrate 14 such that the first metallic layer 18 is encased between the base substrate 14 and the first cover substrate 26.

Figure 1:
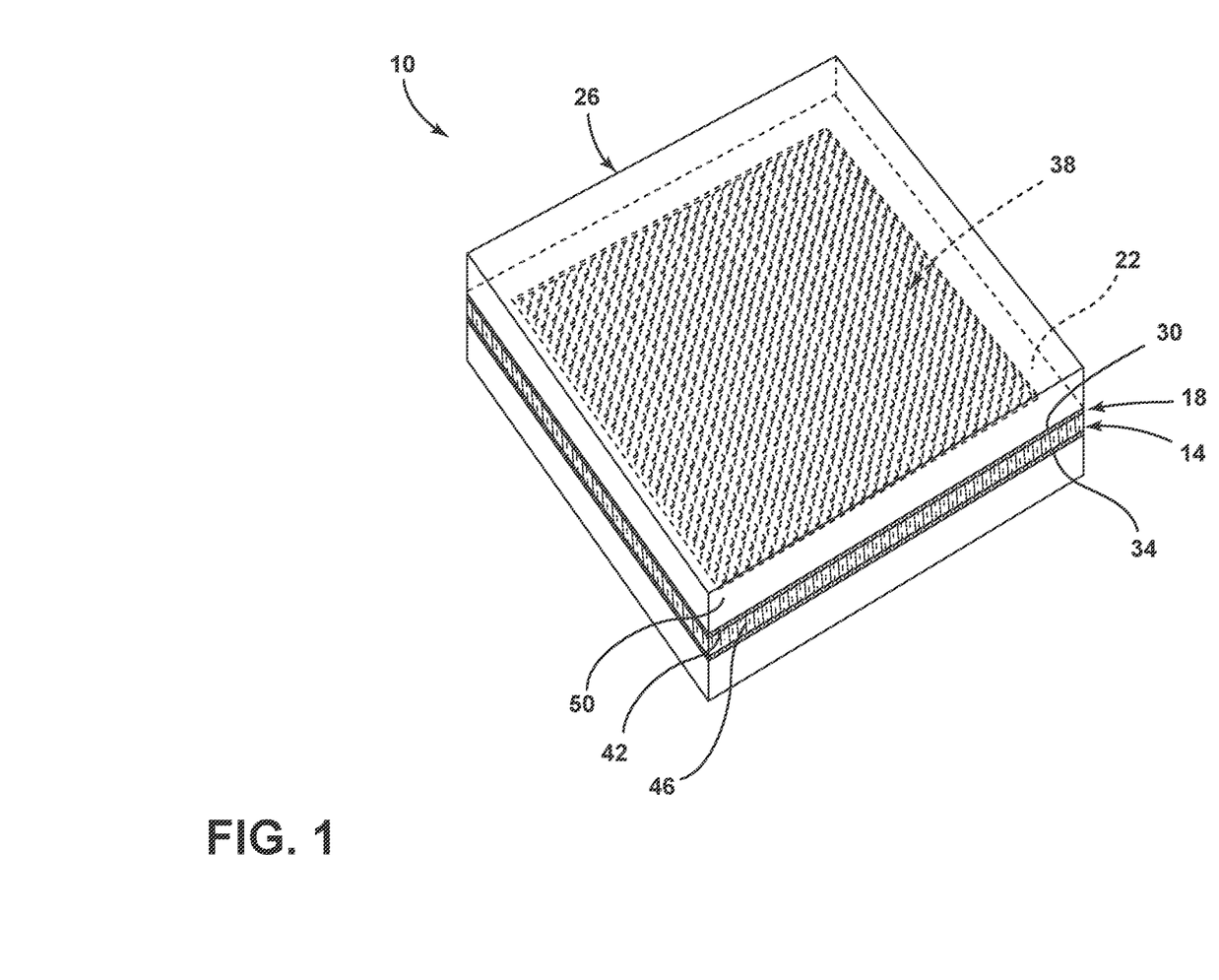
FIG. 1 is a top perspective view of a storage medium, illustrating a first side thereof, according to one example.
Figure 2:
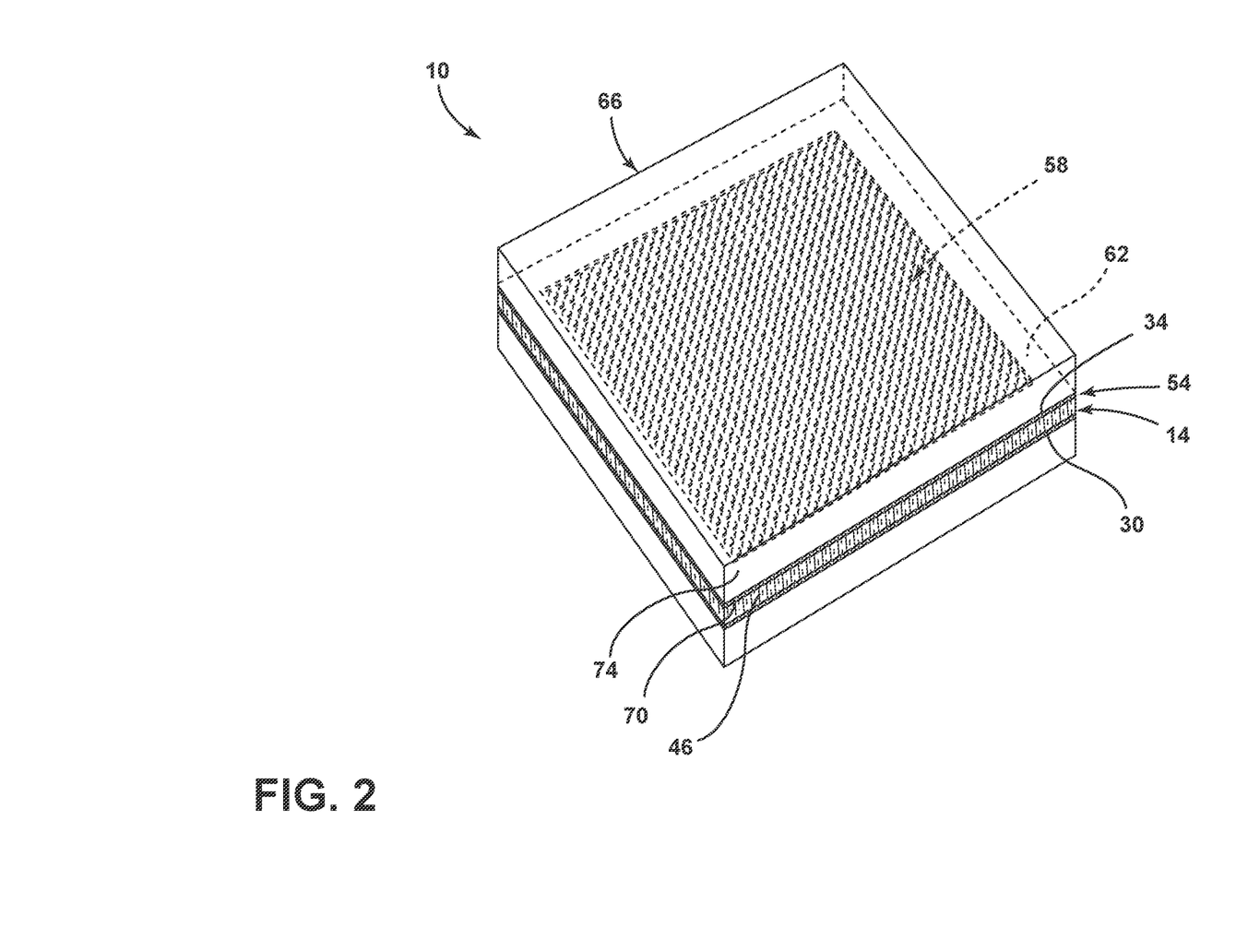
FIG. 2 is a top perspective view of the storage medium, illustrating a second side thereof, according to one example.

Referring now to FIGS. 1 and 2, the second side 34 of the base substrate 14 can be arranged in a similar manner to the first side 30. For example, a second metallic layer 54 may directly abut the second side 34 of the base substrate 14. The second metallic layer 54 can define a second pattern 58. In some examples, the first pattern 38 and the second pattern 58 may differ from one another. In various examples, a second border region 62 extends about the second pattern 58. In such examples, the second border region 62 may surround the second pattern 58. A second cover substrate 66 may be positioned against an exposed surface of the second metallic layer 54 such that the second metallic layer 54 is positioned between the second side 34 of the base substrate 14 and the second cover substrate 66. In various examples, the second metallic layer 54 may be made of aluminum. However, the present disclosure is not so limited. Rather, alternative metals may be employed in the second metallic layer 54. For example, the second metallic layer 54 may be made from silver.

Referring again to FIGS. 1 and 2, an exposed surface of the second metallic layer 54 is a side of the second metallic layer 54 that is opposite to a side of the second metallic layer 54 that is in direct physical contact with the second side 34 of the base substrate 14. For example, if a bottom surface of the second metallic layer 54 is in direct physical contact with the second side 34 of the base substrate 14, then the exposed surface of the second metallic layer 54 may be a top surface of the second metallic layer 54. The second cover substrate 66 may be coupled to the second border region 62. For example, the second cover substrate 66 may be coupled to the second border region 62 by laser welding. In some examples, the second border region 62 may be an unpatterned region of the second metallic layer 54. In such examples, an edge 70 of the second metallic layer 54 may be aligned with the edge 46 of the base substrate 14. Similarly, in such examples, the edge 70 of the second metallic layer 54 may be aligned with an edge 74 of the second cover substrate 66. Accordingly, in such an example, the edge 70 of the second metallic layer 54, the edge 46 of the base substrate 14, and the edge 74 of the second cover substrate 66 may be coplanar with one another. In alternative examples, the second border region 62 may be a region of the base substrate 14. In such examples, the edge of the second metallic layer 54 may be sealed by the coupling between the second cover substrate 66 and the base substrate 14 such that the second metallic layer 54 is encased between the base substrate 14 and the second cover substrate 66.

Referring further to FIGS. 1 and 2, the base substrate 14 may include at least one material chosen from a glass material, a ceramic material, and a glass-ceramic material. Said another way, the base substrate 14 may include a glass material, a ceramic material, and/or a glass-ceramic material. In some examples, the first cover substrate 26 may include at least one material chosen from a glass material, a ceramic material, and a glass-ceramic material. Said another way, the first cover substrate 26 may include a glass material, a ceramic material, and/or a glass-ceramic material. The materials employed to form the base substrate 14 may differ from the materials employed to form the first cover substrate 26. Alternatively, the materials employed to form the base substrate 14 may be the same as the materials employed to form the first cover substrate 26. In various examples, the base substrate 14 and the first cover substrate 26 may differ in at least one physical property and/or may differ in at least one chemical property. For example, it may be preferable for the base substrate 14 to absorb at least one wavelength of visible light whereas it may be preferable for the first cover substrate 26 to be transparent to at least one wavelength of visible light. In some examples, the base substrate 14 may absorb light at each wavelength within the visible light spectrum. In various examples, the first cover substrate 26 may be transparent to light at each wavelength within the visible light spectrum. More generally, it may be beneficial for the first cover substrate 26 to be transparent at a wavelength of light at which data stored upon the storage medium 10 is to be read and the base substrate 14 may not be transparent at the wavelength of light at which the data stored upon the storage medium 10 is to be read. For example, the base substrate 14 may be at least partially absorb the wavelength of light at which the data stored upon the storage medium 10 is to be read. In some examples, rather than the base substrate 14 at least partially absorbing the wavelength of light at which the data stored upon the storage medium 10 is to be read, an absorbing layer may be applied to the second side 34 of the base substrate 14 and the base substrate 14 may be transparent at the wavelength of light at which the data stored upon the storage medium 10 is to be read. The wavelength(s) of light that are utilized to read data stored upon the storage medium 10 may be, but are not limited to, ultraviolet light, visible light, and/or infrared light.

Referring still further to FIGS. 1 and 2, the second cover substrate 66, when employed, may include at least one material chosen from a glass material, a ceramic material, and a glass-ceramic material. Said another way, the second cover substrate 66 may include a glass material, a ceramic material, and/or a glass-ceramic material. The materials employed to form the base substrate 14 may differ from the materials employed to form the second cover substrate 66. Alternatively, the materials employed to form the base substrate 14 may be the same as the materials employed to form the second cover substrate 66. In various examples, the base substrate 14 and the second cover substrate 66 may differ in at least one physical property and/or may differ in at least one chemical property. For example, it may be preferable for the base substrate 14 to absorb at least one wavelength of light whereas it may be preferable for the second cover substrate 66 to be transparent to the same wavelength of light that the base substrate 14 absorbs. In some examples, the base substrate 14 may absorb light at each wavelength within the visible light spectrum. In various examples, the second cover substrate 66 may be transparent to light at each wavelength within the visible light spectrum.

Referring again to FIGS. 1 and 2, it may be preferable for the base substrate 14 to absorb as much light as possible within a wavelength range that the first pattern 38 and/or the second pattern 58 is intended to be read within. For example, when the first pattern 38 and/or the second pattern 58 is intended to be read within the visible spectrum, it may be beneficial for the base substrate 14 to absorb as much light within the visible spectrum as practicable (e.g., for the base substrate 14 to be black in color). Such an arrangement can increase a contrast ratio between the base substrate 14, the first pattern 38, and/or the second pattern 58. Such an arrangement can also be beneficial in preventing interference between regions of the opposing metallic layer that had not been etched and the given side of the storage medium 10 being read. For example, if the base substrate 14 were transparent at the wavelength(s) of light that the storage medium 10 were read at, then portions of the unpatterned second metallic layer 58 that are in contact with the second side 34 of the base substrate 14 can reflect the light being used to read the first pattern 38 and ultimately decrease a resolution and/or a contrast of the reading of the first pattern 38.

Referring yet again to FIGS. 1 and 2, in some examples, the first cover substrate 26 and the second cover substrate 66 may be identical in composition, identical in chemical properties, and/or identical in physical properties. Alternatively, in various examples, the first cover substrate 26 and the second cover substrate 66 may differ in composition, differ in at least one chemical property, and/or differ in at least one physical property. For example, the first cover substrate 26 and the second cover substrate 66 may be transparent to different wavelength(s) of light. Such an approach may aid in simultaneous reading of data encoded on the first metallic layer 18 (e.g., the first pattern 38) and data encoded on the second metallic layer 54 (e.g., the second pattern 58). For example, by reading the data encoded on the first metallic layer 18 with a different wavelength of light than the data encoded on the second metallic layer 54 is read with, it may be possible to filter out wavelength(s) of light that are attributed to the opposing side of the storage medium 10. Such an approach may decrease background noise (e.g., cross-talk) between the data stream coming from the first metallic layer 18 and the data stream coming from the second metallic layer 54 when the data is being read while also increasing a possible read speed for the storage medium 10.

The transparency of the first cover substrate 26 and the second cover substrate 66 may be described by a transmission (%) of a wavelength of visible light through the first cover substrate 26 or the second cover substrate 66. The first cover substrate 26 and/or the second cover substrate 66 is considered transparent when the transmission for a wavelength of visible light is about 50% or greater. In various embodiments, the first cover substrate 26 and/or the second cover substrate 66 may exhibit a transmission for a wavelength of visible light of about 55% or greater, about 60% or greater, about 65% or greater, about 70% or greater, about 75% or greater, about 80% or greater, about 85% or greater, about 86% or greater, about 87% or greater, about 88% or greater, about 89% or greater, about 90% or greater, about 91% or greater, or about 92% or greater, when measured at a thickness of about 1 millimeter. As used herein, "visible light" includes the wavelengths of light visible to the human eye and includes the wavelengths ranging from about 330 nm to 800 nm.

Figure 3:
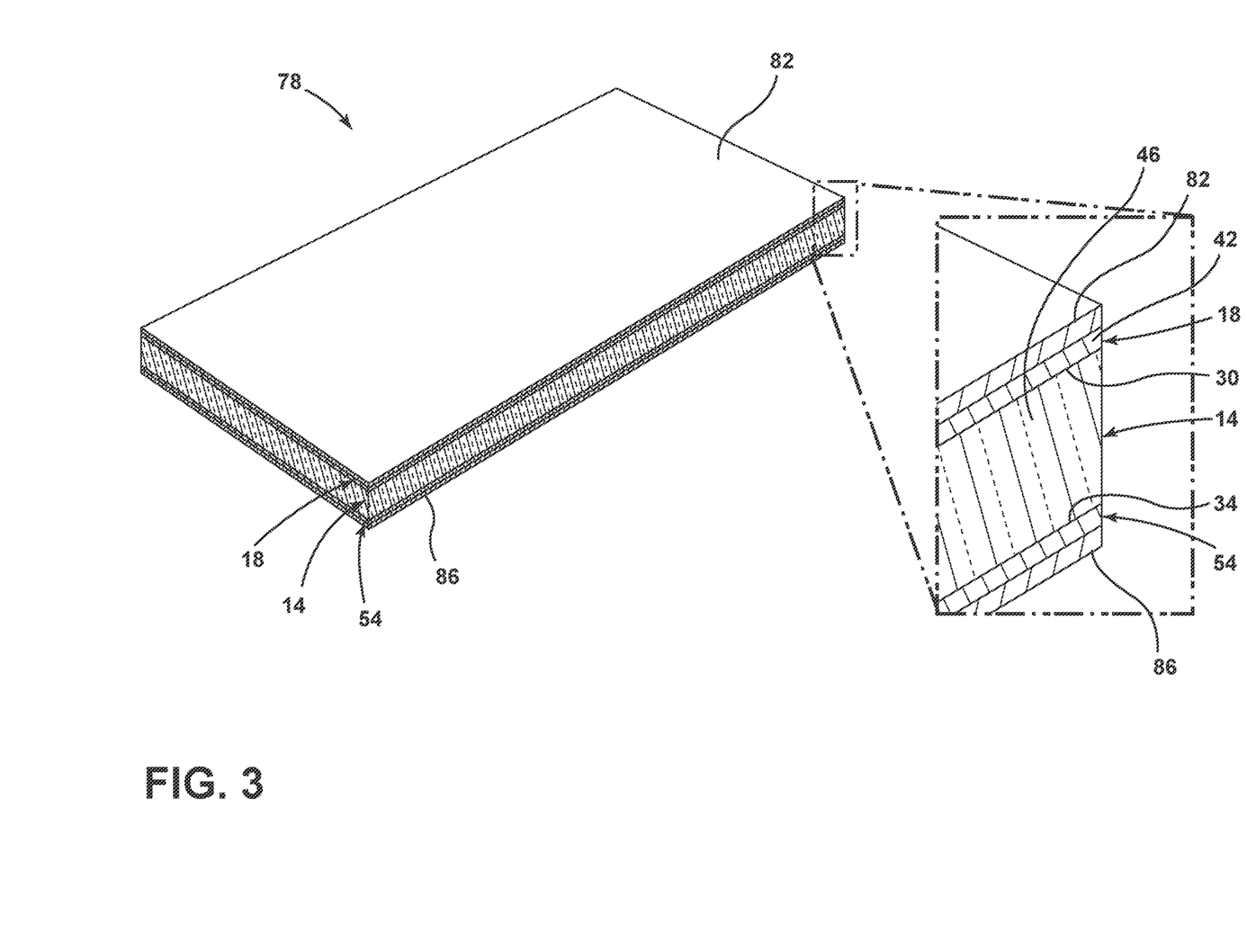
FIG. 3 is a side perspective view of a storage medium precursor, illustrating various components thereof, according to one example.
Figure 4:
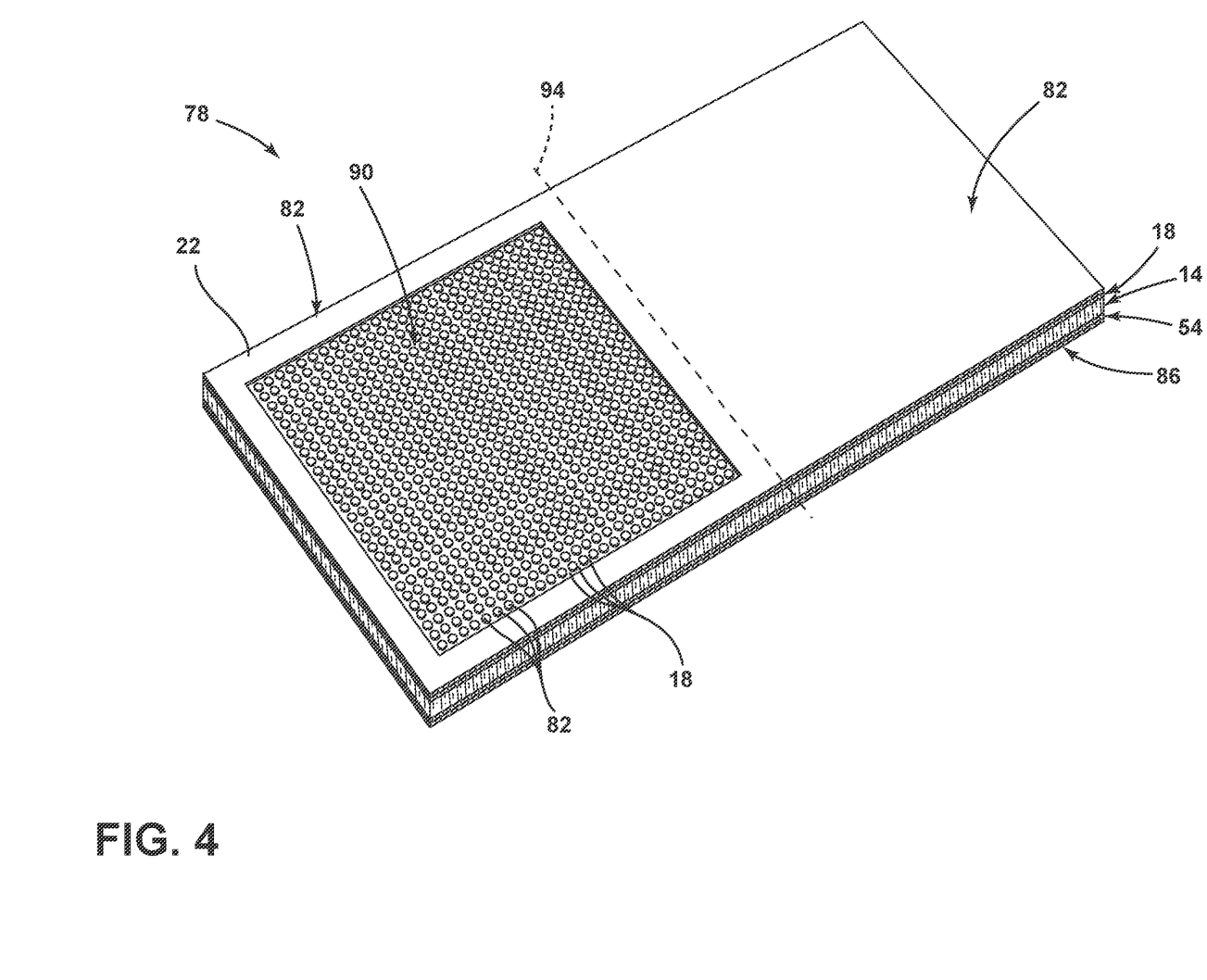
FIG. 4 is a top perspective view of the storage medium precursor, illustrating a patterned portion and an unpatterned portion, according to one example.
Figure 5:
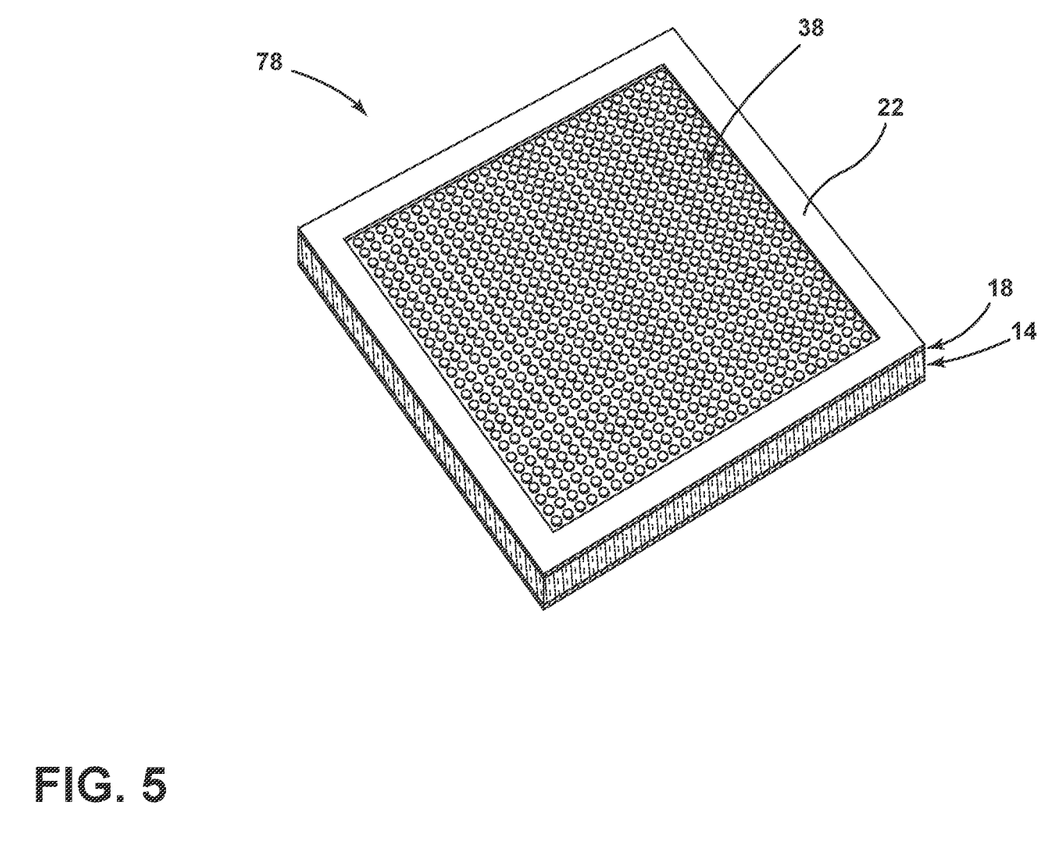
FIG. 5 is a top perspective view of the storage medium precursor, illustrating the patterned portion of the storage medium precursor separated from the unpatterned portion of the storage medium precursor, according to one example.

Referring now to FIGS. 3-5, in the process of creating the storage medium 10, a storage medium precursor 78 is generated and subjected to a formation process that results in storage of information upon the storage medium 10. In general, generation of the storage medium precursor 78 can begin by coating a substrate, such as the first metallic layer 18 and/or the second metallic layer 54, with a light-sensitive organic material (e.g., a photoresist). A pattern is then directly applied to a surface of the light-sensitive organic material by selectively exposing regions of the light-sensitive organic material to light. A solvent, called a developer, is then applied to the light-sensitive organic material. In the case of a positive photoresist, the light-sensitive organic material is degraded by light and the developer dissolves away the regions that were exposed to light, leaving behind regions of the photoresist where the photoresist was not exposed to light. In the case of a negative photoresist, the light-sensitive organic material is strengthened (either polymerized or cross-linked) by light, and the developer dissolves away only the regions that were not exposed to light. A positive photoresist or a negative photoresist may be employed in the execution of the concepts discussed here.

In the example depicted in FIG. 3, the base substrate 14 is provided with the first metallic layer 18 coupled to the first side 30 thereof and the second metallic layer 54 coupled to the second side 34 thereof. Additionally, a first photoresist layer 82 is applied to the exposed surface of the first metallic layer 18 such that the first metallic layer 18 is positioned between the first side 30 of the base substrate 14 and the first photoresist layer 82. Similarly, a second photoresist layer 86 is applied to the exposed surface of the second metallic layer 54 such that the second metallic layer 54 is positioned between the second side 34 of the base substrate 14 and the second photoresist layer 86. In some examples, once the base substrate 14 is provided with at least one metallic layer and at least one photoresist layer, the resulting arrangement may be referred to as the storage medium precursor 78. However, the present disclosure is not so limited. Rather, the storage medium precursor 78 may be any arrangement that is ready to undergo the formation process that results in storage of information being imparted thereto. In various examples, the storage medium precursor 78 may alternatively be referred to as a storage medium blank.

With specific reference to FIG. 4, after the metallic layer(s) and the photoresist layer(s) have been applied to the base substrate 14, the storage medium precursor 78 is ready to receive marking(s) that will correspond to information that will be stored on the finished storage medium 10. For example, the first photoresist layer 82 may be removed from a portion of the storage medium precursor 78 such that a precursor 90 to the first pattern 38 is defined by the first photoresist layer 82. In various examples, the first photoresist layer 82 may be removed from a portion of the storage medium precursor 78 by a combination of irradiation (e.g., an electron beam or a laser beam) and application of a chemical (e.g., a developer). For example, when the first photoresist layer 82 is a positive photoresist, the first photoresist layer 82 may be selectively degraded by application of irradiation to define the precursor 90 to the first pattern 38. Next, the degraded portion(s) of the first photoresist layer 82 may be removed from the portion of the storage medium precursor 78 by application of a chemical that removes the degraded portion(s) of the first photoresist layer 82 (e.g., a developer). In one specific example, the precursor 90 to the first pattern 38 can be applied by direct write lithography, which is also known as maskless lithography. Use of maskless lithography can enable on-the-fly patterning of the first photoresist layer 82 and/or the second photoresist layer 86 as one or more data streams are received.

Referring again to FIG. 4, removal of the first photoresist layer 82 from a portion of the first metallic layer 18 results in exposure of that portion of the first metallic layer 18 while the remainder of the first metallic layer 18 remains covered by the first photoresist layer 82. The exposed portion(s) of the first metallic layer 18 may define the precursor 90 to the first pattern 38. Once the precursor 90 is defined by the first photoresist layer 82, the exposed portion(s) of the first metallic layer 18 are subjected to a process that decreases a thickness of the first metallic layer 18 at the exposed portion(s). For example, a chemical may be applied to the exposed portion(s) of the first metallic layer 18 to decrease the thickness of the first metallic layer 18. The chemical applied to the exposed portion(s) of the first metallic layer 18 may be an acid etchant, an alkali metal hydroxide, and/or a dilute mineral acid. In some examples, the first metallic layer 18 may be entirely removed from the base substrate 14 at the exposed portion(s) such that the exposed portion(s) of the first metallic layer 18 are converted into apertures defined by the first metallic layer 18. In such an example, the base substrate 14 may be visible through the apertures now defined by the first metallic layer 18. Once the thickness of the first metallic layer 18 has been decreased at the exposed portion(s), the first pattern 38 has been applied to the first metallic layer 18. In one specific example, the first metallic layer 18 may be made of aluminum and the chemical applied to the exposed portion(s) of the first metallic layer 18 may be an aluminum etchant.

Referring now to FIGS. 4 and 5, after the first pattern 38 has been applied to the first metallic layer 18, the storage medium precursor 78 may be separated from adjacent stored information at a termination line 94 in examples where the storage medium precursor 78 is not a single unit. For example, the storage medium precursor 78 may be cut along the termination line 94 after a first stream of data has been imparted to the storage medium precursor 78 when the storage medium precursor 78 has a greater surface area than the first stream of data required. The remaining unmarked storage medium precursor 78 can subsequently be utilized for imparting a second stream of data after separation along the termination line 94. The storage medium precursor 78 may be separated along the termination line 94 prior to removal of the first photoresist layer 82. Alternatively, the storage medium precursor 78 may be separated along the termination line 94 after removal of the first photoresist layer 82. The first photoresist layer 82 may be chemically removed from the first metallic layer 18, thereby exposing the remainder of the first metallic layer 18 that was not patterned. The chemical used to remove the first photoresist layer 82 can differ from the developer discussed above. Said another way, the portion of the first photoresist layer 82 that is removed after application of the first pattern 38 to the first metallic layer 18 may require a different chemical for such removal than the removal of the first photoresist layer 82 when the first pattern 38 was initially applied to the first photoresist layer 82. The chemicals suitable for removal of the first photoresist layer 82 after application of the first pattern 38 to the first metallic layer 18 may be generally referred to as strippers.

Referring again to FIGS. 4 and 5, once the first photoresist layer 82 has been removed, the first cover substrate 26 (see FIGS. 1 and 2) can be positioned in direct contact with the first metallic layer 18 and/or the base substrate 14. After the first cover substrate 26 has been so positioned, the first cover substrate 26 can be coupled to the first border region 22, thereby completing the storage medium 10 on the first side 30 of the base substrate 14. In various examples, the coupling of the first cover substrate 26 to the first border region 22 may be carried out in an inert atmosphere in an effort to prevent oxidation of the first metallic layer 18. In some examples, the storage medium 10 may be configured as a thin film assembly that is capable of being wound onto rolls. In one specific example, the thin film assembly may utilize a thin glass as the base substrate 14, a thin glass as the first cover substrate 26, a thin glass as the second cover substrate 66, a thin layer of the first metallic layer 18, and/or a thin layer of the second metallic layer 54. In various examples, the storage medium precursor 78 may be capable of being wound onto rolls while the finished storage medium 10 may be configured as a thin film assembly that is segmented and stored as individual data sets rather than as a portion of a roll. For example, after the storage medium precursor 78 has been marked with the first pattern 38 and/or the second pattern 58, the first cover substrate 26 and/or the second substrate 66 are secured to the storage medium precursor 78 in the final stages of manufacture. Once the first cover substrate 26 and/or the second cover substrate 66 have been coupled to the storage medium precursor 78, a rigidity of the device can increase. Accordingly, a rigidity of the storage medium 10 may be greater than a rigidity of the storage medium precursor 78. Segmentation of the storage medium precursor 78 (e.g., along the termination line 94) can occur either before or after securing the first cover substrate 26 and/or the second cover substrate 66 to the storage medium precursor 78. Segmentation, as used herein, refers to separating a first data set from a second data set by, for example, physically cutting the storage medium precursor 78 or the final storage medium 10.

The process discussed above for imparting the precursor 90 of the first pattern 38, applying the first pattern 38, and completing the storage medium on the first side 30 of the base substrate 14 can be similarly carried out on the second side 34 of the base substrate 14. In examples where the first photoresist layer 82 and the second photoresist layer 86 are each present, the first and second photoresist layers 82, 86 may be simultaneously marked. Similarly, the first and second metallic layers 18, 54 may be simultaneously etched. It is further contemplated that the remainder of the first and second photoresist layers 82, 86 may be removed simultaneously following the application of the first pattern 38 and the second pattern 58. The first pattern 38 and/or the second pattern 58 may depict any storable form of information. For example, and without limitation, the first pattern 38 and/or the second pattern 58 may depict image data, alphanumeric data, and/or indicia.

Figure 6:
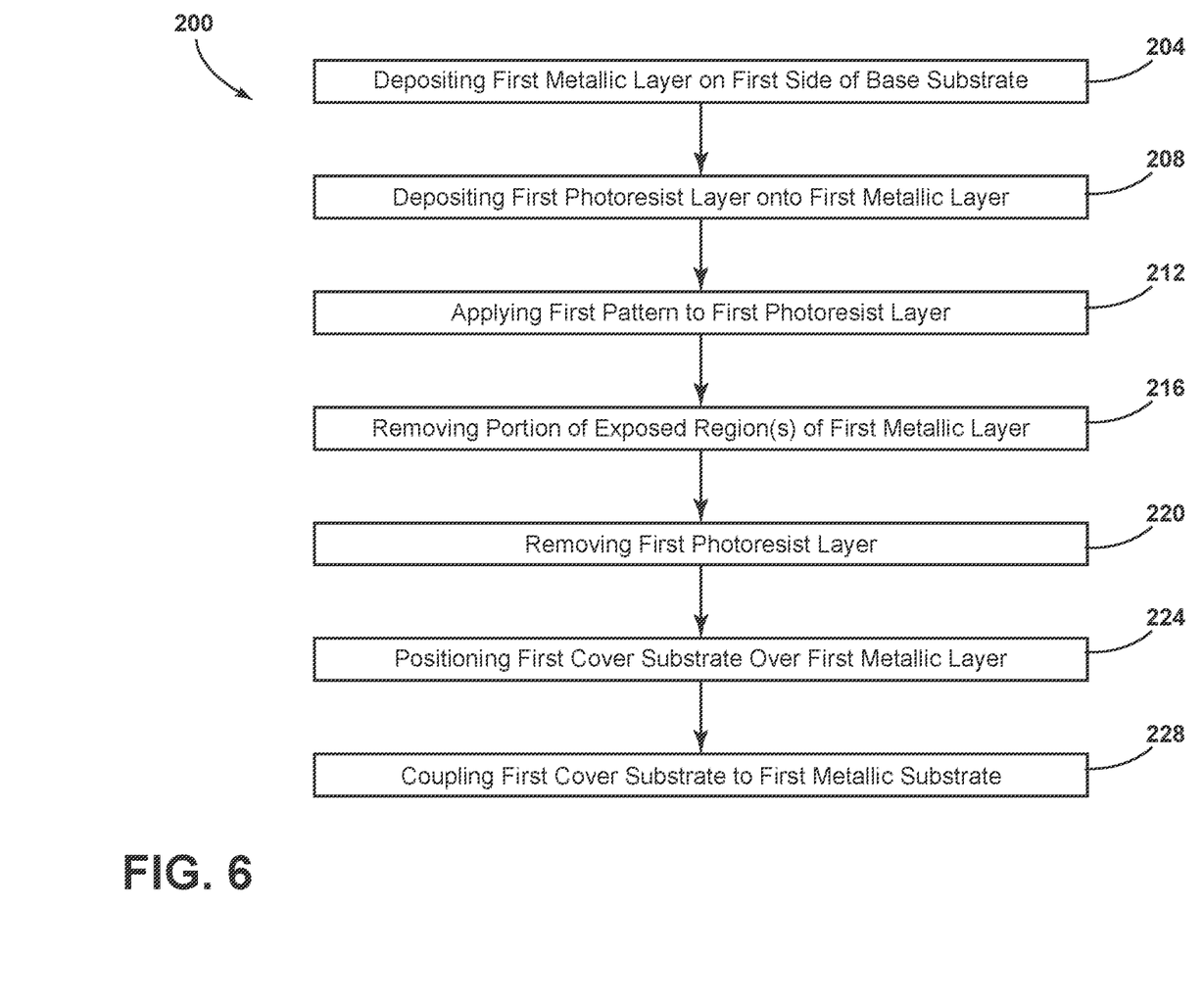
FIG. 6 is a flow diagram illustrating a method of storing information, according to one example.

Referring to FIG. 6, a method 200 of storing information is schematically depicted. The method 200 includes step 204 of depositing the first metallic layer 18 on the first side 30 of the base substrate 14. In various examples, the base substrate 14 may absorb light at one or more wavelength of light (e.g., ultraviolet light, visible light, and/or infrared light). The method 200 also includes step 208 of depositing the first photoresist layer 82 onto an exposed surface of the first metallic layer 18 such that the first metallic layer is positioned between the first side 30 of the base substrate 14 and the first photoresist layer 82. Additionally, the method 200 includes step 212 of applying the first pattern 38 to the first photoresist layer 82. The application of the first pattern 38 to the first photoresist layer 82 followed by development of the first photoresist layer 82 exposes regions of the first metallic layer 18 that are positioned directly below the first pattern 38. The method 200 further includes step 216 of removing a portion of the regions of the first metallic layer 18 that are exposed by the first pattern 38 such that the first pattern 38 is imprinted onto the first metallic layer 18. Said another way, a thickness of the first metallic layer 18 is decreased at the region(s) that are exposed by the first pattern 38 such that the first pattern 38 is replicated in the first metallic layer 18. In various examples, the thickness of the first metallic layer 18 may be decreased by an etchant that is capable of removing at least some of the first metallic layer 18. The etchant utilized and/or the duration of time that the first metallic layer 18 is exposed to the etchant may dictate the extent of removal of material from the exposed region(s) of the first metallic layer 18. In some examples, an entirety of the thickness of the first metallic layer 18 may be removed from the region(s) exposed by the first pattern 38 such that the base substrate 14 is visible through the first metallic layer 18 at such region(s).

Referring again to FIG. 6, the method 200 also includes step 220 of removing the first photoresist layer 82. The step 220 of removing the first photoresist layer 82 can be executed after the step 216 of removing a portion of the region(s) of the first metallic layer 18 that are exposed by the first pattern 38. Additionally, the method 200 includes step 224 of positioning the first cover substrate 26 over the first metallic layer 18 such that the first metallic layer 18 is positioned between the first side 30 of the base substrate 14 and the first cover substrate 26. In various examples, the step 224 of positioning the first cover substrate 26 over the first metallic layer 18 may be performed after the step 220 of removing the first photoresist layer 82. The first cover substrate 26 may be transparent at one or more wavelengths of the visible light spectrum. The method 200 further includes step 228 of coupling the first cover substrate 26 to the first metallic layer 18 such that information conveyed by the first pattern 38 is stored. Alternatively, the method 200 may include a step of coupling the first cover substrate 26 to the base substrate 14 such that information conveyed by the first pattern 38 is stored. In either example, the first cover substrate 26 may be coupled to the first border region 22 such that information conveyed by the first pattern 38 is stored in a protected state—(e.g., protected from external environmental influence).

Referring further to FIG. 6, in various examples, the step 216 of removing a portion of the region(s) of the first metallic layer 18 that are exposed by the first pattern 38 such that the first pattern 38 is imprinted onto the first metallic layer 18 can include applying an etchant to the exposed region(s) of the first metallic layer 18. In some examples, the step 228 of coupling the first cover substrate 26 to the first metallic layer 18 such that information conveyed by the first pattern 38 is stored can include laser welding the first cover substrate 26 and the first metallic layer 18 together. For example, the first cover substrate 26 may be coupled to the first metallic layer 18 at the first border region 22.

Referring still further to FIG. 6, the method 200 can include the execution on the second side 34 of the base substrate 14 of similar steps to those performed on the first side 30. For example, the method 200 can include a step of depositing the second metallic layer 54 on the second side 34 of the base substrate 14. The method 200 can also include a step of depositing the second photoresist layer 86 onto the exposed surface of the second metallic layer 54 such that the second metallic layer 54 is positioned between the second side 34 of the base substrate 14 and the second photoresist layer 86. Additionally, the method 200 can include a step of applying the second pattern 58 to the second photoresist layer 86. In such an example, similar to the first pattern 38, the second pattern 58 exposes regions of the second metallic layer 54 that are positioned directly below the second pattern 58. The method 200 can further include a step of removing a portion of the region(s) of the second metallic layer 18 that are exposed by the second pattern 58 such that the second pattern 58 is imprinted onto the second metallic layer 54. For example, the step of removing a portion of the region(s) of the second metallic layer 18 that are exposed by the second pattern 58 such that the second pattern 58 is imprinted onto the second metallic layer 54 can include applying an etchant to the exposed region(s) of the second metallic layer 54.

Referring again to FIG. 6, the method 200 can include a step of removing the second photoresist layer 86. The step of removing the second photoresist layer 86 can be executed after the step of removing a portion of the region(s) of the second metallic layer 54 that are exposed by the second pattern 58. The method 200 can also include a step of positioning the second cover substrate 66 over the second metallic layer 54 such that the second metallic layer 54 is positioned between the second side 34 of the base substrate 14 and the second cover substrate 66. In various examples, the second cover substrate 66 may be transparent at one or more wavelengths of light (e.g., ultraviolet light, visible light, and/or infrared light). The method 200 can further include a step of coupling the second cover substrate 66 to the second border region 62 such that information conveyed by the second pattern 58 is stored. In some examples, the second border region 62 is defined by the base substrate 14. In alternative examples, the second border region 62 is defined by the second metallic layer 54.

Referring further to FIG. 6, in various examples, the step of coupling the second cover substrate 66 to the second border region 62 such that information conveyed by the second pattern 58 is stored can include laser welding the second cover substrate 66 to the second border region 62. For example, the second cover substrate 66 may be coupled to the base substrate 14 by laser welding. Alternatively, the second cover substrate 66 may be coupled to the second metallic layer 54 by laser welding. It is contemplated the one or more steps of the method 200 may be performed simultaneously. For example, when the second photoresist layer 86 is present, it may be beneficial to simultaneously perform the step 212 of applying the first pattern 38 to the first photoresist layer 82 and the step of applying the second pattern 58 to the second photoresist layer 86. Similarly, when the second photoresist layer 86 is present, it may be beneficial to simultaneously perform the step 220 of removing the first photoresist layer 82 and the step of removing the second photoresist layer 86.

It will be apparent to those skilled in the art that various modifications and variations can be made without departing from the spirit or scope of the claims.

What is claimed is:

1. A storage medium, comprising:
   a base substrate having a first side and a second side, wherein the first side and the second side oppose one another;
   a first metallic layer that defines a first pattern, wherein the first metallic layer directly abuts the first side of the base substrate;
   a first border region that extends about the first pattern; and
   a first cover substrate, wherein the first cover substrate is positioned against an exposed surface of the first metallic layer such that the first metallic layer is positioned between the first side of the base substrate and the first cover substrate, and wherein the first cover substrate is coupled to the first border region, wherein the base substrate absorbs at least one wavelength of visible light.

2. The storage medium of claim 1, wherein the first border region is an unpatterned region of the first metallic layer.

3. The storage medium of claim 1, wherein the first border region is a region of the base substrate.

4. The storage medium of claim 1, wherein the first cover substrate comprises at least one material chosen from, a glass material, a ceramic material, and a glass-ceramic material.

5. The storage medium of claim 1, wherein the first cover substrate is transparent to at least one wavelength of visible light.

6. The storage medium of claim 5, wherein the first cover substrate is transparent at each wavelength within the visible light spectrum.

7. The storage medium of claim 1, wherein the first cover substrate is coupled to the first border region by laser welding.

8. The storage medium of claim 1, wherein the base substrate absorbs light at each wavelength within the visible light spectrum.

9. The storage medium of claim 1, further comprising:
   a second metallic layer that defines a second pattern, wherein the second metallic layer directly abuts the second side of the base substrate;
   a second border region that extends about the second pattern; and
   a second cover substrate, wherein the second cover substrate is positioned against an exposed surface of the second metallic layer such that the second metallic layer is positioned between the second side of the base substrate and the second cover substrate, and wherein the second cover substrate is coupled to the second border region.

10. The storage medium of claim 9, wherein the second cover substrate is transparent to at least one wavelength of visible light.

11. The storage medium of claim 10, wherein the second cover substrate is transparent at each wavelength within the visible light spectrum.

12. The storage medium of claim 9, wherein the first metallic layer and the second metallic layer are each made of aluminum.

13. The storage medium of claim 9, wherein the first pattern and the second pattern are different from one another.

14. The storage medium of claim 9, wherein the second border region is an unpatterned region of the second metallic layer.

15. The storage medium of claim 9, wherein the second border region is a region of the base substrate.

16. The storage medium of claim 9, wherein the second cover substrate comprises at least one material chosen from, a glass material, a ceramic material, and a glass-ceramic material.

17. The storage medium of claim 1, wherein the base substrate comprises at least one material chosen from, a glass material, a ceramic material, and a glass-ceramic material.

18. A storage medium, comprising:
   a base substrate having a first side and a second side, wherein the first side and the second side oppose one another, wherein the base substrate absorbs light at each wavelength within the visible light spectrum, and wherein the base substrate comprises at least one material chosen from, a glass material, a ceramic material, and a glass-ceramic material;
   a first metallic layer that defines a first pattern, wherein the first metallic layer directly abuts the first side of the base substrate;
   a first border region that extends about the first pattern;
   a first cover substrate, wherein the first cover substrate is positioned against an exposed surface of the first metallic layer such that the first metallic layer is positioned between the first side of the base substrate and the first cover substrate, wherein the first cover substrate is coupled to the first border region, wherein the first cover substrate comprises at least one material chosen from, a glass material, a ceramic material, and a glass-ceramic material, and wherein the first cover substrate is transparent at each wavelength within the visible light spectrum;
   a second metallic layer that defines a second pattern, wherein the second metallic layer directly abuts the second side of the base substrate, and wherein the first pattern and the second pattern are different from one another;
   a second border region that extends about the second pattern; and a second cover substrate, wherein the second cover substrate is positioned against an exposed surface of the second metallic layer such that the second metallic layer is positioned between the second side of the base substrate and the second cover substrate, wherein the second cover substrate is coupled to the second border region, wherein the second cover substrate is transparent at each wavelength within the visible light spectrum, and wherein the second cover substrate comprises at least one material chosen from, a glass material, a ceramic material, and a glass-ceramic material.

19. The storage medium of claim 18, wherein the first border region is an unpatterned region of the first metallic layer.

20. The storage medium of claim 18, wherein the first border region is a region of the base substrate.

21. The storage medium of claim 18, wherein the first cover substrate is coupled to the first border region by laser welding.

22. The storage medium of claim 18, wherein the first metallic layer and the second metallic layer are each made of aluminum.

23. The storage medium of claim 18, wherein the second border region is an unpatterned region of the second metallic layer.

24. The storage medium of claim 18, wherein the second border region is a region of the base substrate.

25. A method of storing information, comprising the steps of:
depositing a first metallic layer on a first side of a base substrate, wherein the base substrate absorbs light at each wavelength within the visible light spectrum;
depositing a first photoresist layer onto an exposed surface of the first metallic layer such that the first metallic layer is: (i) positioned between the first side of the base substrate and the first photoresist layer and (ii) directly abuts the first side of the base substrate;
applying a first pattern to the first photoresist layer, wherein the first pattern exposes regions of the first metallic layer that are positioned directly below the first pattern;
removing a portion of the regions of the first metallic layer that are exposed by the first pattern such that the first pattern is imprinted onto the first metallic layer;
removing the first photoresist layer;
positioning a first cover substrate over the first metallic layer such that the first metallic layer is positioned between the first side of the base substrate and the first cover substrate, wherein the first cover substrate is transparent at each wavelength of the visible light spectrum; and
coupling the first cover substrate to the first metallic layer through a first border region that extends about the first pattern, such that the first cover substrate is coupled to the first border region and information conveyed by the first pattern is stored.

26. The method of storing information of claim 25, wherein the step of removing a portion of the regions of the first metallic layer that are exposed by the first pattern such that the first pattern is imprinted onto the first metallic layer comprises applying an etchant to the exposed regions of the first metallic layer.

27. The method of storing information of claim 25, wherein the step of coupling the first cover substrate to the first metallic layer such that information conveyed by the first pattern is stored comprises laser welding the first cover substrate and the first metallic layer together.

28. The method of storing information of claim 25, further comprising the steps of:
depositing a second metallic layer on a second side of a base substrate;
depositing a second photoresist layer onto an exposed surface of the second metallic layer such that the second metallic layer is positioned between the second side of the base substrate and the second photoresist layer;
applying a second pattern to the second photoresist layer, wherein the second pattern exposes regions of the second metallic layer that are positioned directly below the second pattern;
removing a portion of the regions of the second metallic layer that are exposed by the second pattern such that the second pattern is imprinted onto the second metallic layer;
removing the second photoresist layer;
positioning a second cover substrate over the second metallic layer such that the second metallic layer is positioned between the second side of the base substrate and the second cover substrate, wherein the second cover substrate is transparent at each wavelength of the visible light spectrum; and
coupling the second cover substrate to the second metallic substrate such that information conveyed by the second pattern is stored.

* * * * *